United States Patent
Washikawa et al.

(10) Patent No.: US 6,492,909 B1
(45) Date of Patent: *Dec. 10, 2002

(54) AUDIO SIGNAL PROCESSING APPARATUS

(75) Inventors: Sakae Washikawa, Chiba (JP); Koji Hirano, Kanagawa (JP); Shigeru Saegusa, Tokyo (JP); Keiichi Nakamura, Ibaraki (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/149,825

(22) Filed: Sep. 8, 1998

(30) Foreign Application Priority Data

Sep. 10, 1997 (JP) ................................................. 9-245814

(51) Int. Cl.[7] .................................................. H04L 5/00
(52) U.S. Cl. ............................ 340/825.25; 340/825.24; 340/825.53; 348/705; 348/706; 381/77; 381/80; 381/81; 381/123
(58) Field of Search ....................... 340/825.25, 825.24, 340/825.53; 348/705, 706; 381/77, 80, 81, 113, 123

(56) References Cited

U.S. PATENT DOCUMENTS

| 5,414,417 A | * | 5/1995 | Heo | 340/825.25 |
| 5,699,052 A | * | 12/1997 | Miyahara | 340/825.25 |
| 5,802,300 A | * | 9/1998 | Tanaka et al. | 340/825.25 |
| 5,838,393 A | * | 11/1998 | Simpson et al. | 340/825.25 |
| 5,959,539 A | * | 9/1999 | Adolph et al. | 340/825.07 |

* cited by examiner

Primary Examiner—Brian Zimmerman
Assistant Examiner—Yves Dalencourt
(74) Attorney, Agent, or Firm—Jay H. Maioli

(57) ABSTRACT

An audio signal processing apparatus including a plurality of jack units each of which has at least an audio signal contact piece and a control signal contact piece. A control circuit judges a kind of an audio appliance connected to each of the plurality of jack units based on a control signal obtained at the control signal contact piece, and when a function change-over command to select any one of the audio appliances is supplied, a function selecting circuit selects one of the jack units to which the audio appliance is connected. An audio appliance can be connected to any of the plurality of jack units.

3 Claims, 6 Drawing Sheets

AUDIO SIGNAL PROCESSING APPARATUS

BACKGROUND OF THE INVENTION

1. Field of the Invention

The present invention relates to an audio signal processing apparatus suitable for use in a stereophonic apparatus called a system stereo in which a plurality of audio appliances are used in combination.

2. Description of the Related Art

In the art, a stereophonic apparatus called a system stereo in which used in combination are a plurality of audio appliances has been on market in various types.

FIG. 1 shows an example of this kind of stereophonic apparatus, in which each of the audio appliances is connected to an amplifier apparatus 50. In detail, a compact disk reproducing apparatus 61 which reproduces a compact disk (CD) on which a digital audio signal is recorded, a tuner 62 receiving an FM broadcast, an AM broadcast and so on, a disk recording and reproducing apparatus 63 which records and reproduces an audio signal by using a magneto optical disk (or optical disk) such as a minidisk (MD) or the like, and a tape recording and reproducing apparatus 64 which records and reproduces an audio signal by using a tape cassette are connected to the amplifier apparatus 50. An audio signal, which is selected by a function change-over switch provided in the amplifier apparatus 50 from the audio signals which are supplied from the respective audio appliances 61, 62, 63 and 64 to the amplifier apparatus 50, is subjected to a predetermined processing (amplification processing in a power amplifier, various signal processing in a DSP and so on) and the audio signal thus processed is supplied to left and right speaker units 65L and 65R connected to the amplifier apparatus 50 and then acoustic sounds are produced therefrom. The audio signal selected by the function change-over switch is also supplied to the apparatuses 63 and 64 capable of recording the audio signal, and a desired audio signal can be recorded by the apparatus 63 or 64.

In the system stereophonic apparatus connected as mentioned above, it is necessary to connect the respective audio appliances 61 through 64 to the amplifier apparatus 50 by using a number of audio signal lines.

FIG. 2 shows an example of the arrangement of a connection terminal portion on the rear surface of the amplifier apparatus 50 shown in FIG. 1. As shown in FIG. 2, there are provided an input terminal 51 to be connected with the compact disk reproducing apparatus 61, an input terminal 52 to be connected with the tuner 62, an input/output terminal 53 to be connected with the disk recording and reproducing apparatus 63, an input/output terminal 54 to be connected with the tape recording and reproducing apparatus 64, and a speaker terminal 55 to be connected with the speaker units 65L and 65R. In this case, the input terminals 51 and 52 are terminals inputted with left and right audio signals, respectively, and each of which is formed of two jacks, while the input/output terminals 53 and 54 are terminals inputted with the left and right audio signals and terminals outputting the same and each of which is formed of four jacks.

As set forth above, on the rear surface of the amplifier apparatus 50, there are arranged a number of connection terminal units, and the respective audio appliances are connected to the amplifier apparatus in such a manner that a plug, which is called a pin plug provided on a tip end of each connection cord connected to each audio appliance, is inserted into each predetermined jack of the amplifier apparatus for connection. The connection work, however, requires much time and further easily permit erroneous connection. In other words, the input and output terminals of the audio signal are formed of jacks that are the same in shape and, as shown in FIG. 2, a name or the like of the appliance to be connected is indicated near each terminal. However, upon carrying out an actual connecting work, since a number of jacks are the same in shape and also located close to one another, the connection is mistaken frequently.

SUMMARY OF THE INVENTION

In view of the problem mentioned above, it is an object of the present invention to provide an audio signal processing apparatus by which the connection work of a system stereophonic apparatus can be carried out easily with no complexity.

According to the present invention, there is provided an audio signal processing apparatus which is provided with a plurality of terminal units each having at least an audio signal input contact piece and a control signal contact piece, and a control means for judging the kind of an audio appliance connected to each terminal unit on the basis of a control signal obtained at the terminal unit and for making a function selection means select, when a function change-over command to select any of the audio appliances is issued, a terminal unit to which is connected the appliance of kind thus discriminated.

According to the present invention, when a function change-over command to change over an audio appliance is issued by a key operation or the like, the terminal unit connected with the appliance indicated by that command is judged by the control means, and the corresponding terminal unit is selected by the function selection means. Therefore, even when a plurality of audio appliances are connected to any ones of a plurality of terminal units prepared in any order, the connected audio appliance can be selected correctly.

BRIEF DESCRIPTION OF THE DRAWINGS

FIG. 6 is a flow chart showing a process according to the example of the present invention when a power source is switched on;

DESCRIPTION OF THE PREFERRED EMBODIMENTS

An example of the present invention will be described with reference to FIGS. 3 to 9. The present example shows such an example in which the present invention is applied to a system stereophonic apparatus using a plurality of audio appliances in combination.

Figure 1:
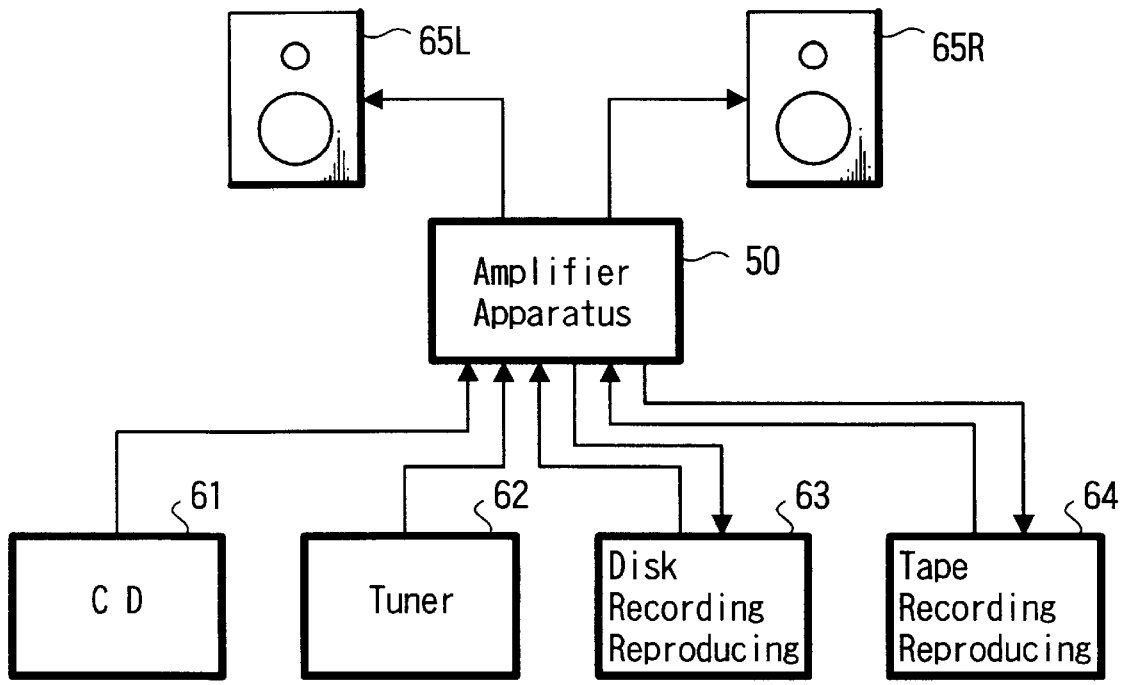
FIG. 1 is a block diagram showing a connection example of a conventional stereophonic apparatus.
Figure 2:
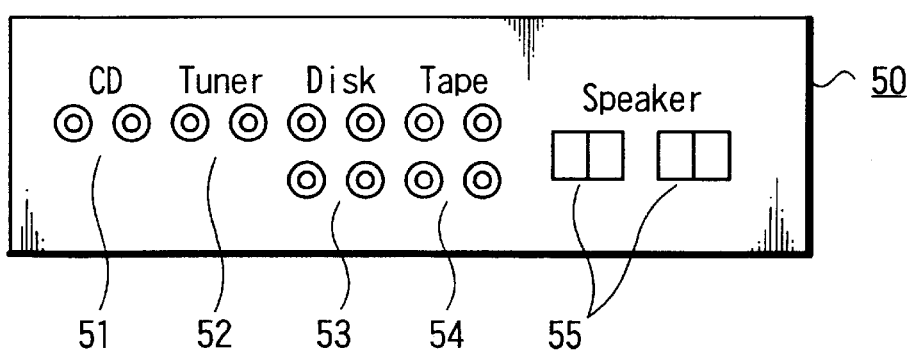
FIG. 2 is a plan view showing an example of the rear surface of an amplifier apparatus shown in FIG. 1.
Figure 3:
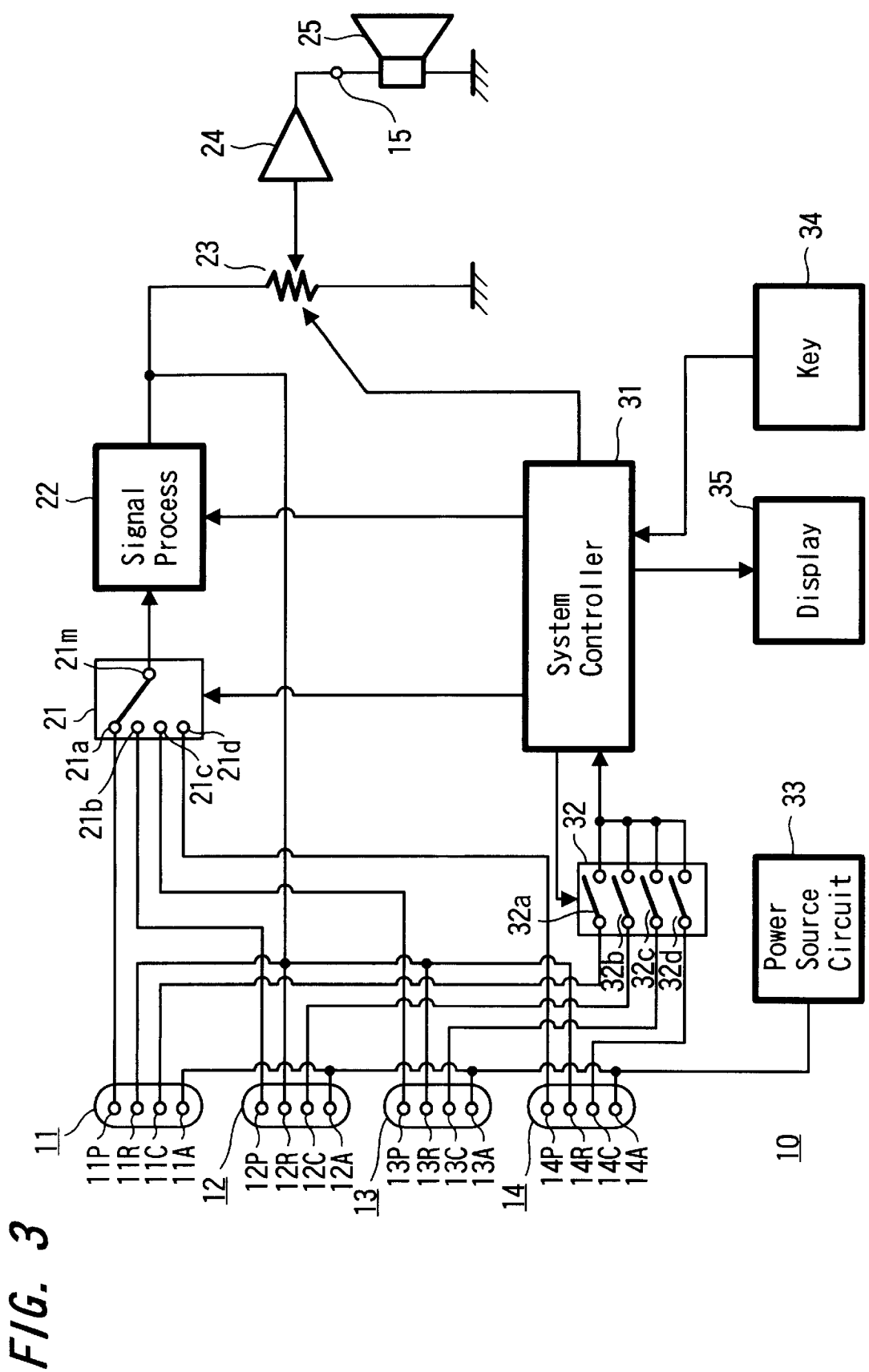
FIG. 3 is a diagram showing an arrangement of an amplifier apparatus to which an example of the present invention is applied.

FIG. 3 shows an arrangement of, for example, an amplifier apparatus 10 as an audio signal processing apparatus according to the present invention. Hereafter, the arrangement of the amplifier apparatus 10 will be described with reference to FIG. 3. As shown in FIG. 3, the amplifier apparatus 10 is provided with a first terminal unit 11, a second terminal unit 12, a third terminal unit 13 and a fourth terminal unit 14 or totally four terminal units to which audio appliances are to be connected, respectively. Each of the terminal units 11 to 14 is arranged as a jack into which a normalized plug called as a DIN plug can be inserted.

Figure 4:
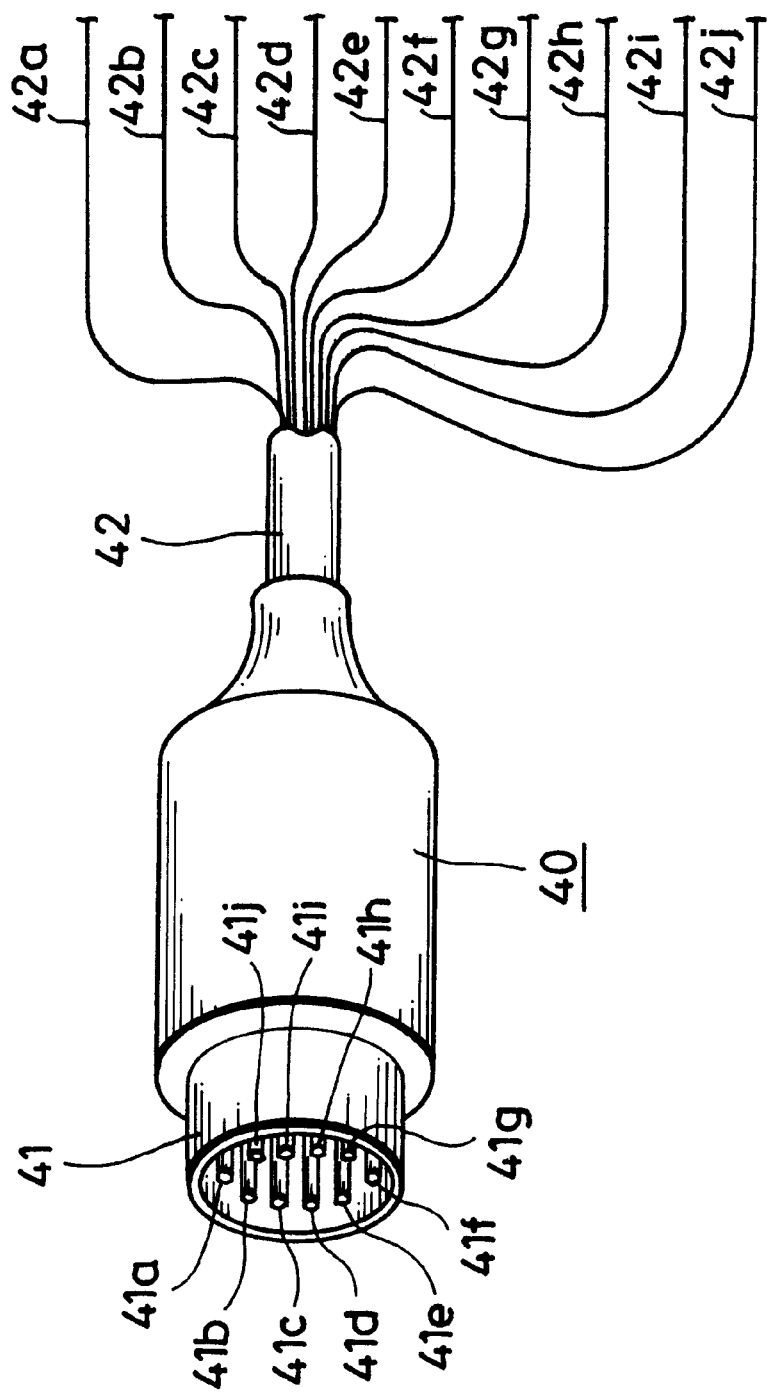
FIG. 4 is a perspective view showing an example of the arrangement of a plug to be connected to a terminal unit.

FIG. 4 shows an example of the structure of a DIN plug 40 having a connection cord 42, which DIN plug 40 is inserted into each of the terminal units 11 to 14. On a tip end 41 of the DIN plug 40 connected to the tip end of the connection cord 42, arranged are 10 connection pins 41a, 41b–41j at a predetermined state, and to the respective connection pins 41a to 41j there are connected signal lines within the connection cord 42, respectively. In detail, an analog ground potential line 42a is connected to the connection pin 41a, a left channel reproduction audio signal line 42b is connected to the connection pin 41b, a right channel reproduction audio signal line 42c is connected to the connection pin 41c, a left channel recording audio signal line 42d to the connection pin 41d, a right channel recording audio signal line 42e to the connection pin 41e, a digital ground potential line 42f to the correction pin 41f, a control bus line 42g to the connection pin 41g, a control bus ground potential line 42h to the connection pin 41h, an AC power source line 42i to the connection pin 41i, and a center tap line 42j to the connection pin 41j, respectively.

By the way, the digital ground potential line 42f serves as a signal line to arrange a ground potential of a microcomputer provided in each audio appliance, and through the AC power source line 42i and the center tap line 42j, an AC power source to activate each audio appliance is supplied from the amplifier apparatus 10 thereto. The AC power source is obtained by transforming a commercial AC power source of 100 V or the like to about 15 V.

Turning back to the explanation of FIG. 3, although respective contact pieces of each of the terminal units 11 to 14, which are to be connected to the ten connection pins 41a to 41j of the DIN plug 40 provided at the tip end of the connection cord 42 connected to each audio appliance, are ten pieces in correspondence with the connection pins 41a to 41j, in FIG. 3, only the contact pieces concerning the subject matter of the present invention are shown and the remaining contact pieces are omitted for the sake of simplicity of explanation.

The respective contact pieces of the terminal units 11 to 14 are classified to reproduction (playback) audio signal contact pieces 11P, 12P, 13P, 14P; recording audio signal contact pieces 11R, 12R, 13R, 14R; control bus contact pieces 11C, 12C, 13C, 14C; and AC power source contact pieces 11A, 12A, 13A, 14A. (In fact, a signal system from the terminal units 11 to 14 to a speaker connection terminal 15 is independently provided for signals of left and right channels, but for the sake of simplicity of explanation, only a single channel, namely one channel system is illustrated.)

The playback audio signal contact pieces 11P to 14P of four terminal units 11 to 14 are respectively connected to corresponding fixed contacts 21a, 21b, 21c, 21d of a function change-over switch 21 and its movable contact 21m is connected to any one of the fixed contacts 21a to 21d under the control of a system controller 31 of the amplifier apparatus 10. A reproduced audio signal selected by the function change-over switch 21 (namely, an audio signal supplied from a connected audio appliance) is supplied to a signal processing circuit 22 which is formed of an integrated circuit called, for example, a DSP (digital signal processor) or the like and carries out various audio signal processes such as a sound quality process, a surround process and so on.

An audio signal processed by the signal processing circuit 22 is supplied to a volume 23 in which it is made to be an audio signal with a level set by the control of the system controller 31. Then, the audio signal is supplied to a power amplifier unit 24 by which it is set an output audio signal to drive a speaker unit 25. The audio signal output from the power amplifier unit 24 is supplied to the speaker connection terminal 15 and emanated as a sound from the speaker unit 25 connected to the terminal 15.

The audio signal processed by the signal processing circuit 22 is also supplied to the recording audio signal contact pieces 11R to 14R of the respective terminal units 11 to 14. If the audio appliance connected to each of the terminal units 11 to 14 is such an appliance which can record a signal, the audio signal obtained at each of the recording audio signal contact pieces 11R to 14R can be recorded by the audio appliance.

The control bus contact pieces 11c to 14c of the terminal units 11 to 14 are connected through a connection switch unit 32 to the control bus terminal of the system controller 31. In this case, the connection switch unit 32 is comprised of connection switches 32a, 32b, 32c, 32d prepared for the respective terminal units independently, and can connect sequentially each of the switches 32a to 32d in a time division manner under the control of the system controller 31. In other words, the connection state of the switch 32a, the connection state of the switch 32b, the connection state of the switch 32c, and the connection state of the switch 32d are repeated sequentially to perform the communication in a time sharing fashion with a micro-computer of an audio appliance connected to each of the terminal units 11 to 14. Under the communication state in this case, data is transmitted bidirectionally in time division in accordance with a predetermined rule.

The AC power source contact pieces 11A to 14A of the terminal units 11 to 14 are all connected to a power source circuit 33 of the amplifier apparatus 10 to supply an AC power source to the audio appliances connected to the terminal units 11 to 14 to drive the audio appliances.

The system controller 31 to control the operation of the amplifier apparatus 10 is made of a micro-computer and controls each of the units based on a command from a key 34 to indicate the function change-over, the setting of a volume value and so on. The operation state (selected state of function or the like) is displayed on a display unit 35 by a letter and so on. Meanwhile, instead of transmitting the command by operating the key 34, it may be possible that an infrared ray signal input unit is provided in the system controller 31 and various commands are transmitted to the system controller 31 on an infrared ray signal or the like from a remote control commander.

Figure 5:
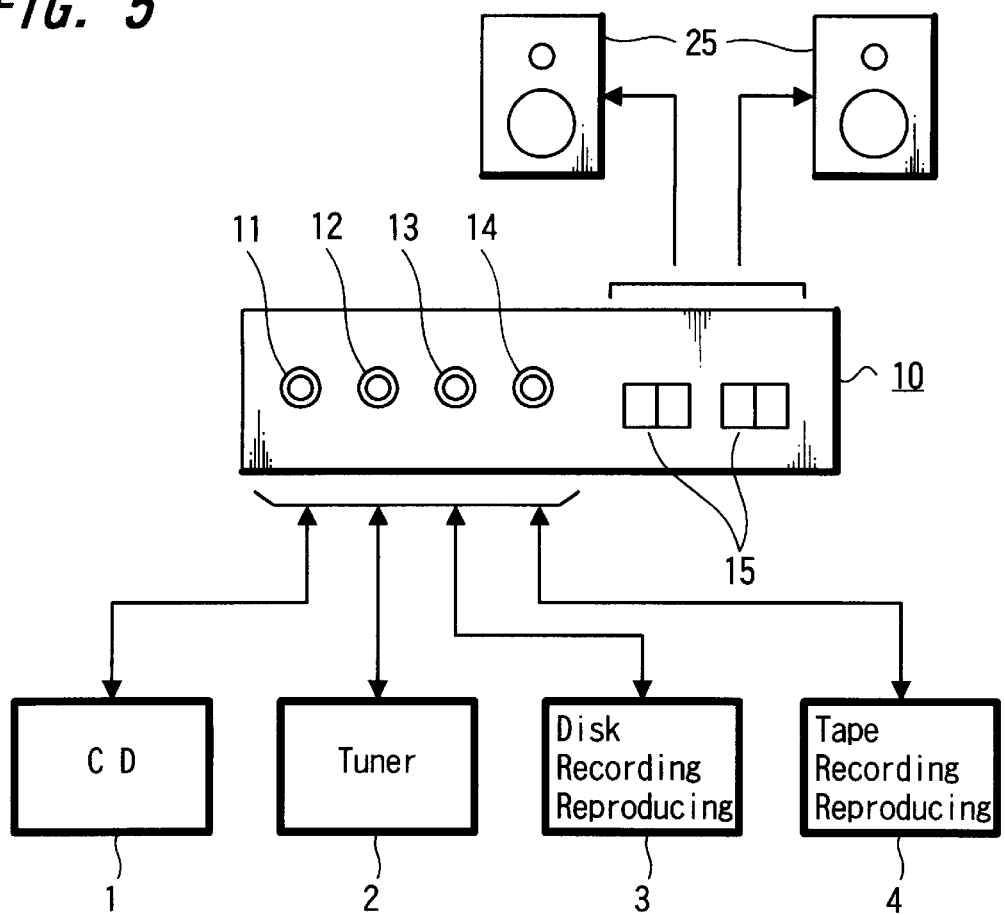
FIG. 5 is a block diagram showing an example of a connection according to an example of the present invention.

The connection state, in which an audio appliance is connected to the amplifier apparatus 10 thus arranged, will be described with reference to FIG. 5. On the rear surface of the amplifier apparatus 10 described in connection with FIG. 3, there are disposed four terminal units 11, 12, 13 and 14, and up to four audio appliances can be connected to the amplifier apparatus 10 by using the terminal units 11 to 14. In the example shown in FIG. 5, a compact disk reproducing apparatus 1, a tuner 2, a disk recording and reproducing apparatus 3 and a tape recording and reproducing apparatus 4 are connected to the amplifier apparatus 10 through the respective connection cords 42 each having at its one end the DIN plug 40 with the arrangement shown in FIG. 4. By the way, each of the audio appliances 1 to 4 to be connected to the present example of amplifier apparatus 10 is provided with a micro-computer which is capable of communicating with the system controller 31 of the amplifier apparatus 10 through the control bus line. The micro-computer provided in each audio appliance has set therein a code to indicate its that is, the type of operation (kind which is carried out by the audio appliance), and the data to be transmitted therefrom to the system controller 31 through the control bus line is attached with that code.

According to the arrangement mentioned above, the plugs 40 of connection cords 42 respectively connected to four audio appliances 1 to 4 may be connected to any ones of four terminal units 11 to 14. That is, the system controller 31 of the amplifier apparatus 10 judges which kinds of audio appliances 1 to 4 are connected to which terminal units 11 to 14 by the communication with the audio appliances 1 to 4 through the control bus contact pieces 11C to 14C. When a function change-over command is issued by the operation of function key 34 or the like, the function change-over switch 21 selects the terminal unit based on that judgement.

Figure 6:
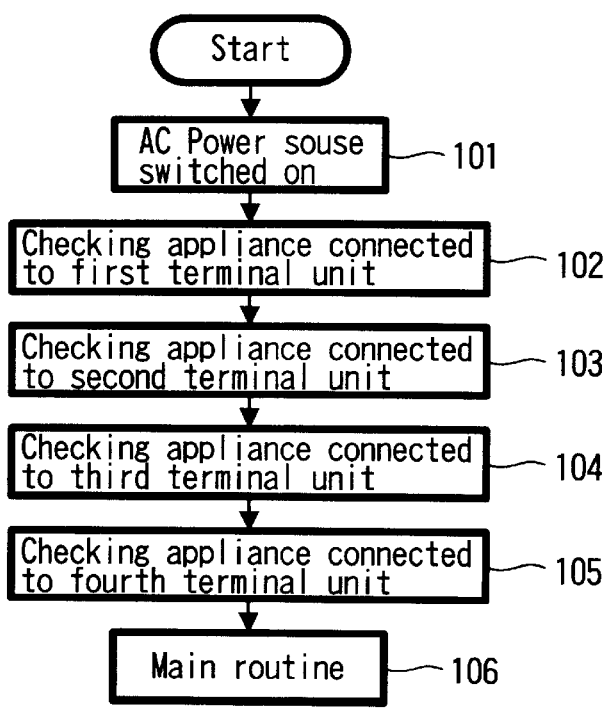
Figure 7:
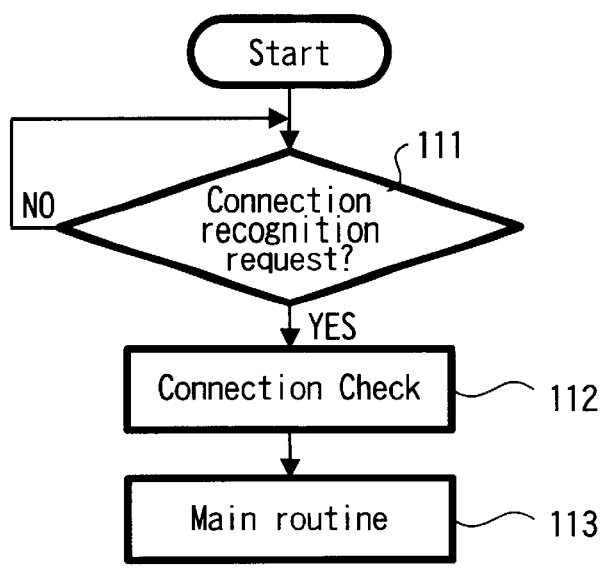
FIG. 7 is a flow chart showing a process according to the example of the present invention when a connection is changed.

Under the state that the respective audio appliances 1 to 4 are connected to the four terminal units 11 to 14 of the amplifier apparatus 10 through the connection cords 42, the judgement of the connected audio appliances by the system controller 31 is carried out when the main power source of the amplifier apparatus 10 is switched on. That is, in the flow chart of FIG. 6 showing the processing operation of the system controller 31 upon switching on the main power source, the system controller 31 carries out a process to switch on the main power source based on the key operation or the like (step 101), then connects the connection switch 32a to communicate with the audio appliance connected to the first terminal unit 11 through the control bus line, judges the kind of code attached to the data supplied from the connected audio appliance, checks the kind of the audio appliance connected to the first terminal unit 11 based on the above judgement, and memorizes the judged kind in the memory in the system controller 31 (step 102).

Next, after the connection switch 32a is set in an inconnected state, the system controller 31 connects the connection switch 32b, communicates with the audio appliance connected to the second terminal unit 12 through the control bus line, judges the kind of code attached to the data supplied from the connected audio appliance, checks the kind of the audio appliance connected to the second terminal unit 12 based on the judgement, and memorizes the judged kind in the memory in the system controller 31 (step 103).

Next, after the connection switch 32b is set in an inconnected state, the system controller 31 connects the connection switch 32c, communicates with the audio appliance connected to the third terminal unit 13 through the control bus line, judges the kind of code attached to the data supplied from the connected audio appliance, checks the kind of the audio appliance connected to the third terminal unit 13 based on the judgement, and memorizes the judged kind in the memory in the system controller 31 (step 104).

Next, after the connection switch 32c is set in an inconnected state, the system controller 31 connects the connection switch 32d, communicates with the audio appliance connected to the fourth terminal unit 14 through the control bus line, judges the kind of code attached to the data supplied from the connected audio appliance, checks the kind of the audio appliance connected to the fourth terminal unit 14 based on the judgement, and memorizes the judged kind in the memory in the system controller 31 (step 105).

When the above mentioned processes are ended, the system controller 31 proceeds to a normal process routine (main routine) as the stereophonic apparatus (step 106). By the way, in the processes from step 102 to step 105, when no data are supplied through a terminal unit at that time, it is judged that the terminal unit is connected with no appliance.

Further, in consideration of such a case where the connections of the terminal units 11 to 14 are changed during the power source being switched on, when the micro-computer provided in the audio appliance to be connected to the amplifier apparatus 10 is supplied with an AC power source through the connection cord 42 connected to the amplifier apparatus 10, the micro-computer requests to recognize the connection by the communication through the control bus line. As shown in the flow chart of FIG. 7, when the system controller 31 of the amplifier apparatus 10 receives the connection recognition request data via the control bus line (step 111), it carries out the connection check process (step 112). This connection check process is the same as the process from step 102 to step 105 at the time when the power source is switched on. When the connection state is recognized by the process, the system controller 31 proceeds to the main routine (step 113).

When the system controller 31 recognizes and memorizes the kind of each of the audio appliances connected to each of the terminal units 11 to 14 by the processes mentioned above, at a time when the function change-over command by the operation of key 34 or the like arrives at the system controller 31, it judges a terminal unit to which the appliance of the corresponding kind (function) is connected based on the memorized data and makes the function change-over switch 21 select that terminal unit. Further, the system controller 31 makes the display unit 35 display the kind of the appliance at that time. For example, when a function change-over command to select the compact disk reproducing apparatus 1 is issued, the system controller 31 judges a terminal unit (for example, terminal unit 11) to which the compact disk reproducing apparatus 1 is connected, changes over the function change-over switch 21 to select that terminal unit and makes the display unit 35 display a selected kind such as "CD" or the like.

By the processes mentioned above, even if a plurality of audio appliance 1 to 4 are connected to a plurality of terminal units 11 to 14 in any order, the function change-over can be carried out accurately. Accordingly, when the audio appliances 1 to 4 are connected to the amplifier apparatus 10, it is completely unnecessary to consider the connection place (position) of the terminal to be connected but it is only enough that the plugs of the connection cords are inserted into and connected to the vacant terminals 11 to 14 in any order. Thus, the connection work can be performed very simply without connection mistake.

In a case of the present example, not only the input portion for the audio signal supplied from the audio appliances 1 to 4 but also the audio signal output portion for recording the audio signal are provided in each of the terminal units 11 to 14 as well as the contact piece for the control bus line and the contact piece for supplying the power source are provided in each of the terminal units 11 to 14. Therefore, the connection of one audio appliance is completed by inserting one plug (DIN plug) into the terminal unit, which leads to a very simple connection work. Further, instead of providing all the contact pieces together in one terminal unit, it may be possible that, for example, the audio signal input contact piece and the audio signal output contact piece are formed of separate terminal units.

Further, in the case of the present example, since the judgement of the kind of audio appliance connected to each of the terminal units 11 to 14 by the system controller 31 which is the control means for the amplifier apparatus 10 is carried out immediately after the power source is switched on, upon actuating the stereophonic apparatus, the connection state is judged without failure. Thus, when the connection order or the like is changed during the power source being switched off, the present invention copes therewith, and hence the connected appliance is not recognized erroneously. Furthermore, even when the connection order is changed during the power source being switched on, since each audio appliance issues the connection recognition request, the present invention can cope with the connection order change during the power source being switched on.

Figure 8:
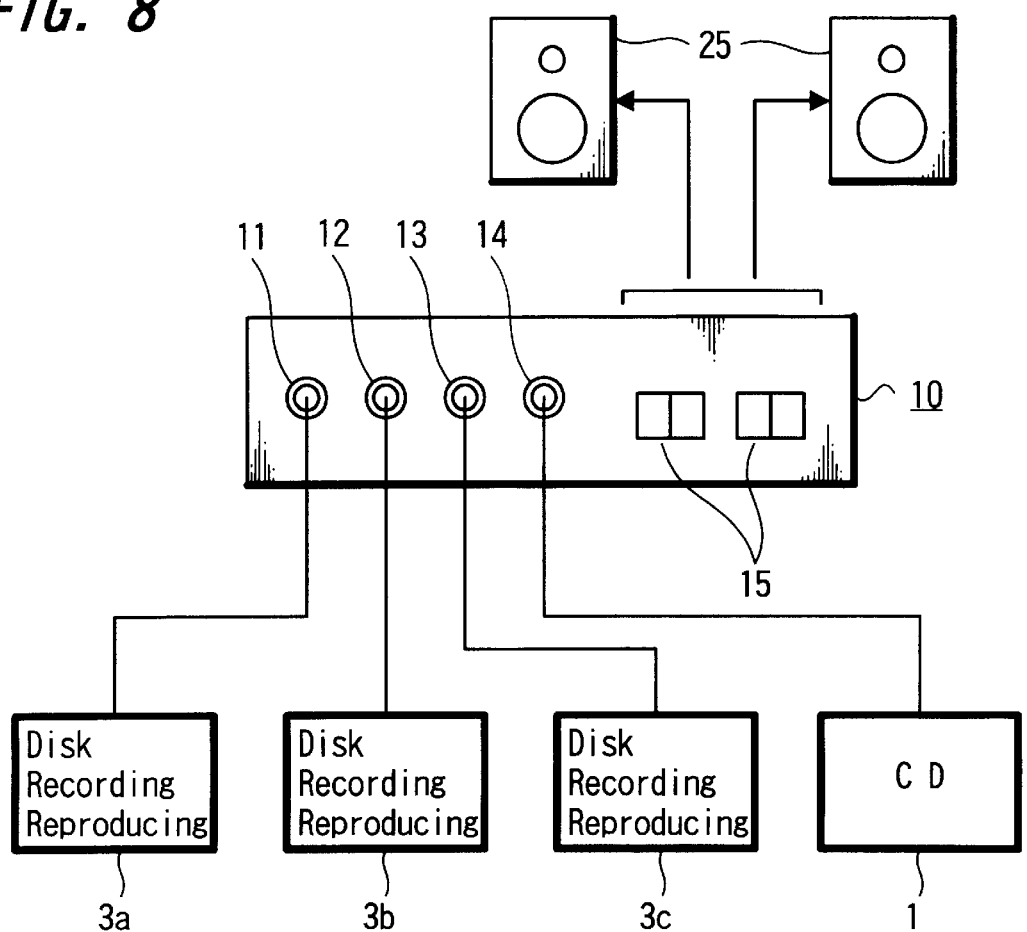
FIG. 8 is a block diagram showing another example of the connection according to the example of the present invention.

While in the above description different kinds of audio appliances are connected to the four terminal units 11 to 14, respectively, it may be possible that the same kind of audio appliances are connected to a plurality of terminal units. For example, such a connection may be possible that as shown in FIG. 8, disk recording and reproducing apparatus 3a, 3b and 3c are connected to the first terminal unit 11, the second terminal unit 12 and the third terminal unit 13, respectively, and the compact disk reproducing apparatus 1 is connected to the fourth terminal unit 14. Such connection makes it possible that, for example, the audio signal reproduced from the compact disk reproducing apparatus 1 connected to the fourth terminal unit 14 is recorded by the three disk recording and reproducing apparatuses 3a, 3b and 3c connected to the first through third terminal units 11 to 13 at the same time. Alternately, when the signal processing system in the amplifier apparatus 10 is arranged correspondingly, it is possible that while the audio signal reproduced from the compact disk reproducing apparatus 1 is being recorded by the disk recording and reproducing apparatus 3a connected to the first terminal unit 11, the audio signal reproduced by the disk recording and reproducing apparatus 3b connected to the second terminal unit 12 is recorded by the disk recording and reproducing apparatus 3c connected to the third terminal unit 13. When such a process is carried out, a switch to select an audio signal to be recorded becomes necessary in addition to the function change-over switch 21.

In the above example of the present invention, four terminal units 11 to 14 are provided on one amplifier apparatus 10, but it is needless to limit the number of the terminal units to four. If the number of terminal units is plural, the present invention can be applied to a case where a desired number of terminal units are provided.

While in the above example of the amplifier apparatus 10, the audio signal processed by the signal processing circuit 22 is supplied to the recording audio signal contact pieces 11R to 14R of the terminal units 11 to 14 for recording, it may be possible that the audio signal selected by the function change-over switch 21 is directly supplied to the recording audio signal contact pieces 11R to 14R to thereby record the audio signal which is not subjected to the sound quality processing or the like.

Figure 9:
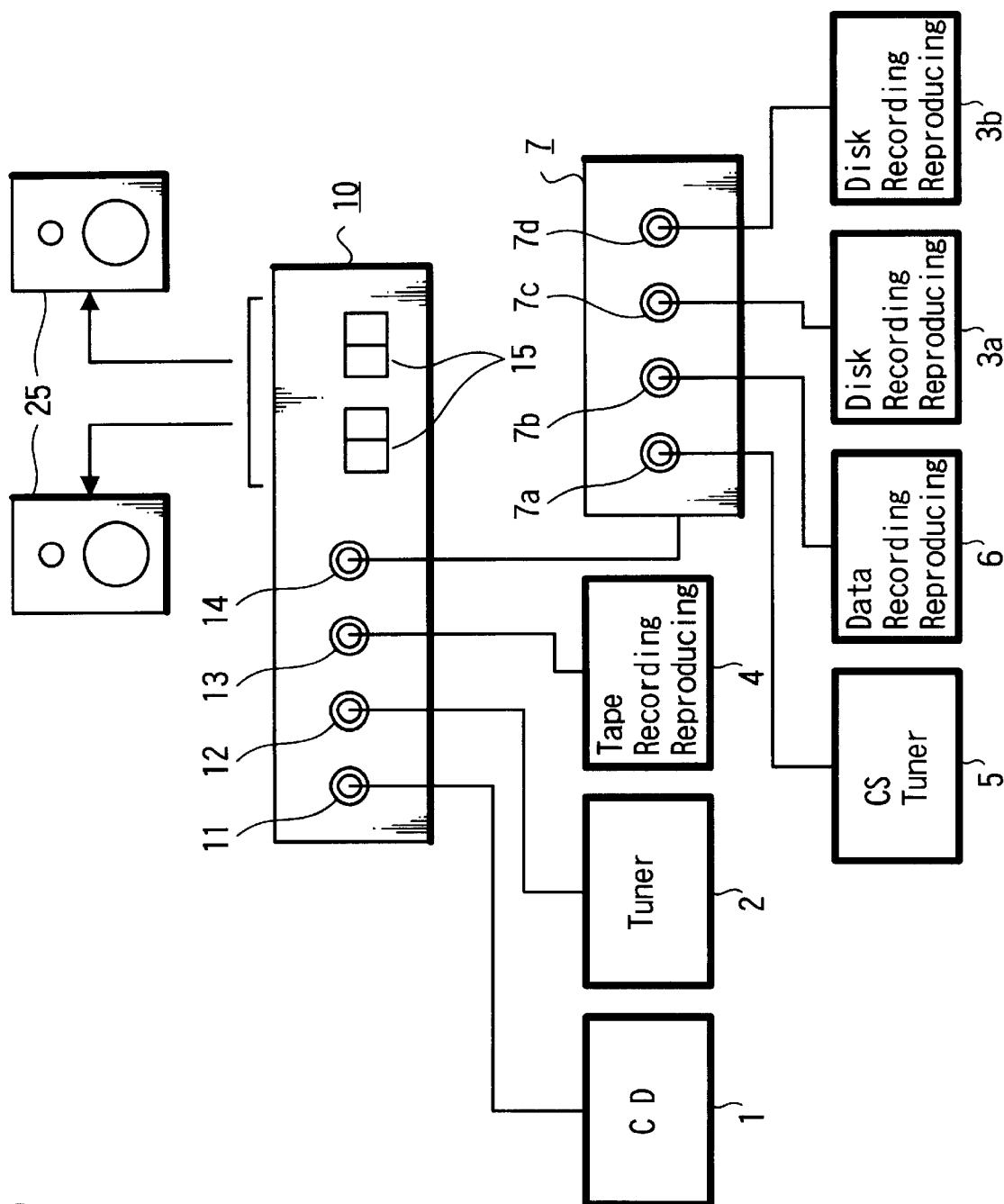
FIG. 9 is a block diagram showing an example of the connection, in which an extension apparatus is used according to the present invention.

When the number of terminal units provided on the amplifier apparatus 10 is insufficient (or the number of audio appliances desired to be connected is larger than that of terminal units), it may be possible that an extension apparatus to increase the number of the terminal units is prepared and the desired audio appliances are connected thereto. FIG. 9 shows an example of this case. In this example, as shown in FIG. 9, the compact disk reproducing apparatus 1, the tuner 2 and the tape recording and reproducing apparatus 4 are connected to the terminal units 11, 12 and 13 of the amplifier apparatus 10, respectively. Then, when four audio appliances are desired to be connected to the amplifier apparatus 10 further, an extension apparatus 7 is connected to the fourth terminal unit 14 of the amplifier apparatus 10. This extension apparatus 7 is provided with four terminal units 7a, 7b, 7c and 7d, each of which is the same as each of the terminal units 11 to 14 of the amplifier apparatus 10 in structure, and has therein a sub-function change-over switch for changing over a reproduced audio signal contact piece of each of the terminal units 7a to 7d. The change-over operation of the sub-function change-over switch is controlled by the data supplied from the system controller 31 through the bus line connected to the terminal unit 14.

When the extension apparatus 7 arrange d as above is employed, audio appliances (in the example of FIG. 9, a CS tuner 5, a digital audio tape recording and reproducing apparatus 6, and two disk recording and reproducing apparatus 3a and 3b) can be further connected to the terminal units 7a, 7b, 7c and 7d of the extension apparatus 7, respectively.

While in the examples described above, the present invention is applied to the function change-over within the amplifier apparatus for the system stereophonic apparatus, it is needless to say that if an apparatus is to change over an audio signal, the present invention can be applied to various kinds of apparatus other than the amplifier apparatus.

According to a first aspect of the present invention, even if a plurality of audio appliances are connected to a plurality of terminal units in any order, the connected audio appliance can be selected correctly. Therefore, when a plurality of audio appliances are connected, it becomes unnecessary to consider the correspondence between the terminal units and the audio appliances, and hence the connection of the system stereophonic apparatus can be simply performed without any mistake.

According to a second aspect of the present invention, in the first aspect, the audio signal output contact piece for outputting the audio signal selected by the function change-over switch or the audio signal processed by the signal processing circuit is provided in each of a plurality of terminal units, so that when an audio appliance capable of recording an audio signal is connected, it is unnecessary to take the connection order, the connection place (position) and so on into consideration and the connection can be performed simply with no mistake.

According to a third aspect of the present invention, in the first aspect since the system controller judges the kind of the audio appliance connected to each of terminal units immediately after the power source being switched on, when the stereophonic apparatus is activated, the connection state is judged without failure and hence the present invention can cope with the case where the connection order, the connection place (position) and the like are changed.

Having described preferred embodiments of the present invention with reference to the accompanying drawings, it is to be understood that the present invention is not limited to the abovementioned embodiments and that various changes and modifications can be effected therein by one skilled in the art without departing from the spirit or scope of the present invention as defined in the appended claims.

What is claimed is:

1. An audio signal processing apparatus, comprising:
    a plurality of identical terminal units electrically connected to a plurality of external signal sources via a respective plurality of connection cords, wherein each of said plurality of identical terminal units includes an audio signal input contact piece, an AC power contact piece, and a control signal contact piece for receiving signals from said plurality of external signal sources including a code indicating a functional type of each of said plurality of external signal sources;
    a power source for supplying AC power to each of said plurality of external signal sources via said AC power contact piece of each of said plurality of identical terminal units, wherein when said power source is supplied to each of said plurality of external signal sources said code is transmitted by each of said plurality of external signal sources to said control signal contact piece of each of said plurality of identical terminal units;
    function selecting means for selecting one of a plurality of audio signals supplied from said respective plurality of connection cords connected respectively from said plurality of external signal sources to said plurality of terminal units;
    processing means for subjecting said one of said plurality of audio signals selected by said function selecting means to predetermined signal processing; and
    control means for scanning said plurality of identical terminal units and judging the functional type of external signal source connected respectively to each of said plurality of terminal units based on the code contained in the control signal received by said control means at said control signal contact piece of each of said plurality of identical terminal units from said plurality of external signal sources, and when an electrical connection of one of said plurality of external signal sources is switched and said audio signal processing apparatus supplies AC power thereto, said one of said plurality of external signal sources automatically transmits a connection recognition request to said audio signal processing apparatus via a respective control signal contact piece so that said audio signal processing apparatus judges a respective functional type thereof.

2. The audio signal processing apparatus as set forth in claim 1, wherein each of said plurality of terminal units comprises an audio signal output contact piece for outputting an audio signal selected by said function selecting means and processed by said processing means.

3. The audio signal processing apparatus as set forth in claim 1, wherein a judgement of said functional type of each of said plurality of external signal sources connected to each of said plurality of identical terminal units by said control means is performed by said control means immediately after said power source is switched on.

* * * * *